June 24, 1958  C. W. ANDERSON  2,839,969
SUPPORTING AND CENTERING CLAMPS FOR
CAM BLANKS IN CAM CUTTING TOOLS
Filed April 26, 1954  2 Sheets-Sheet 2
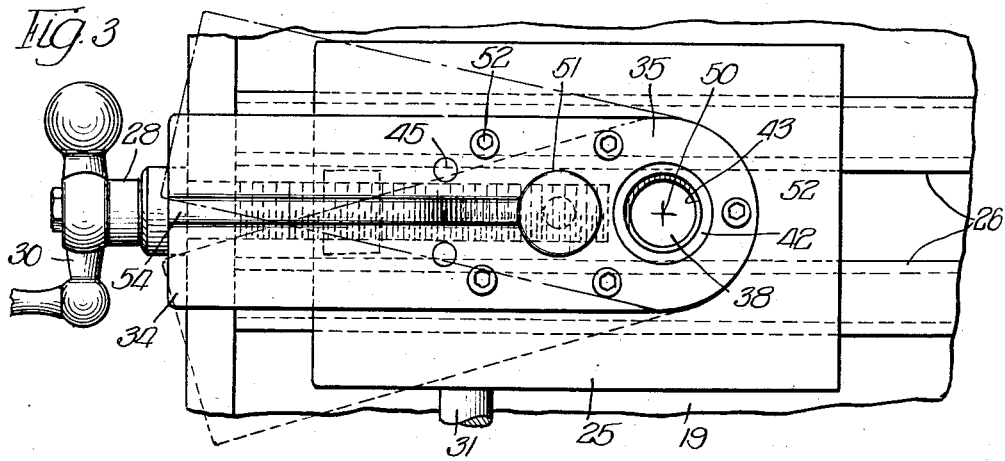
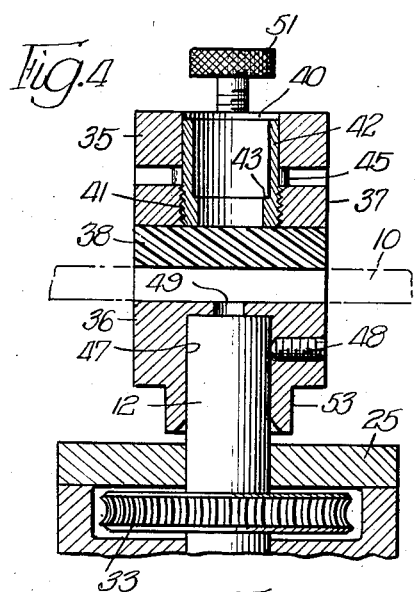
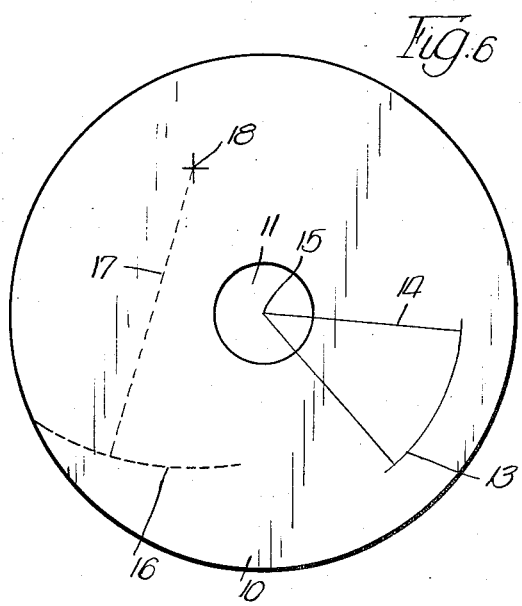
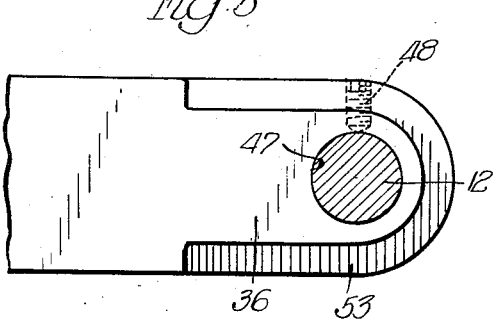
INVENTOR.
Clarence W. Anderson,
BY
ATTY.

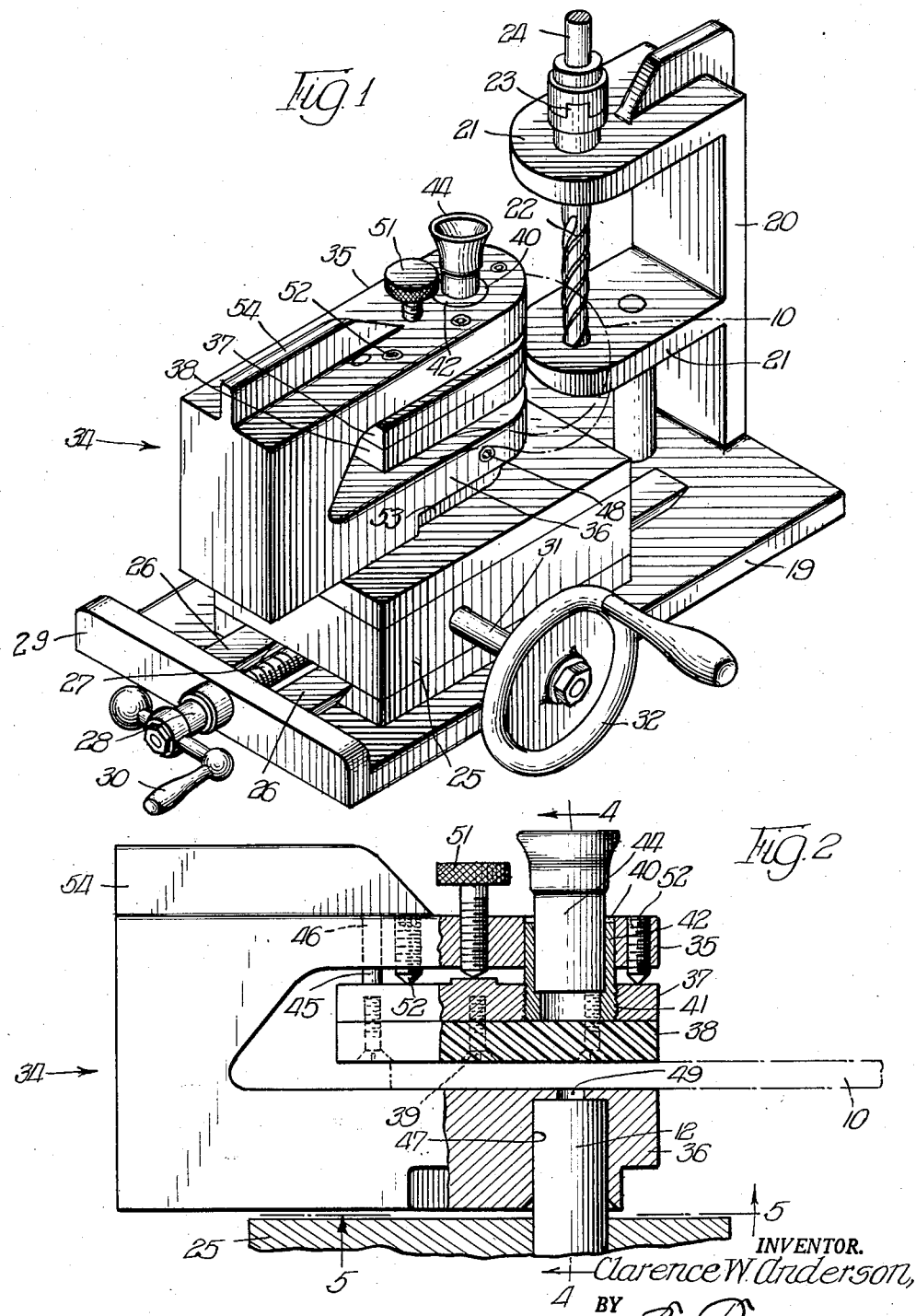

United States Patent Office 2,839,969
Patented June 24, 1958

2,839,969

SUPPORTING AND CENTERING CLAMPS FOR CAM BLANKS IN CAM CUTTING TOOLS

Clarence W. Anderson, Chicago, Ill.

Application April 26, 1954, Serial No. 425,645

3 Claims. (Cl. 90—59)

The present invention relates to cam cutting devices.

In the cam cutting art to which the present device belongs, a circular disk is employed along the edge of which a working surface is cut by a suitable tool, while the disk is rigidly supported at its center for rotating movement back and forth and while the edge of the disk is pressed against a suitable cam cutting tool. In the conventional cam cutting devices the disk out of which a cam is shaped is provided at its center with an opening within which a rotatable shaft is insertable, to which the disk is rigidly affixed in any suitable manner. The axial center of the shaft coincides with the center of the disk. When a rotary movement to the shaft is imparted in either direction the disk will turn therewith. The cutting tool against which the edge of the disk is pressed will cut a working surface of a cam along an arc of any predetermined radius from the axial center of the shaft or from the center of the disk.

When however it is required to cut a working surface of a cam having an arc the radius of which does not coincide with the center of the shaft and of the disk, then quite a complicated gearing, ratchet or helix method is used in order to fashion the cam rise or drop.

Therefore the object of the present invention is the provision of a cam cutting device that is simple in operation and through the use of which the desired result may be obtained without necessity of changing gearing or ratchets.

Another object of the present invention is the provision of a suitable clamp engageable with the rotatable shaft for supporting the cam blank in an operative position with the rotatable shaft with any predetermined point upon the cam blank alined with the axial center of the shaft, the said predetermined point upon the cam blank being located off the center of the cam blank and defining the center of a circle along the arc of which a cam working surface is to be formed by the cutting tool, when the clamp rotates back and forth in unison with the shaft.

Another object of the present invention is the provision of the clamp of the character and for the purpose hereinabove indicated and which may be simple in construction, easily engageable with a rotatable shaft, and by which a cam blank may be easily engaged and firmly held with a predetermined point upon the cam blank centered and alined with the axial center of said shaft.

A still further object of the present invention is the provision in connection with the clamp aforesaid of visual means whereby the predetermined point upon the cam blank may be easily and accurately alined and centered with the axial center of the rotatable shaft.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views:

Fig. 1 is a perspective view of the cam cutting device, including a cam cutting tool, a carriage whereby a cam blank may be shifted towards and against the tool, with the present clamp supportable upon the carriage and engageable with a rotatable shaft projecting from the carriage;

Fig. 2 is an enlarged longitudinal cross sectional view through the present clamp, partly in elevation, in an engagement with a rotatable shaft extending in a vertical direction from the carriage;

Fig. 3 is a top elevational view of the present clamp while in an operative position with the carriage;

Fig. 4 is a transverse cross sectional view on line 4—4 of Fig. 2;

Fig. 5 is a fragmentary bottom elevational view on a reduced scale of the present clamp along line 5—5 of Fig. 2; and Fig. 6 is a cam blank, with a pair of arcs traced thereon, along one of which the cam cutting tool is capable of forming the working surface of the cam by the conventional cam cutting device, and illustrating another arc along which the cutting tool is incapable of forming a cam working surface without utilizing the present clamp.

Referring more particularly to Fig. 6 of the present drawings there is shown a circular disk 10 provided at its center with opening 11 through which shaft 12 is inserted. Disk 10 is a blank out of which a cam may be formed. Disk 10 is keyed to shaft 12 so that when the latter is rotated in either direction said disk 10 may be turned therewith. A cam cutting tool may cut a cam working surface along any arc, such as arc 13 having radius 14, centered at point 15 which coincides with the center of disk 10 or with the axial center of shaft 12.

If however it is desired to cut a working surface upon cam blank 10 along an arc such as arc 16, having a radius such as radius 17, centered at point 18, which may be at a point of the body of disk 10 other than coincidental with the center point 15 of the disk, in the case disk 10 cannot be normally supported upon shaft 12 with the latter extended through opening 11, but a suitable means such as the present clamp must be designed which would rigidly support the cam blank with relation to shaft 12, with point 18 centered or alined with the axial center of shaft 12.

The conventional cam cutting devices include base 19 from one end of which standard 20 projects in a vertical direction. A pair of parallelly disposed brackets 21 laterally project from said standard 20, for supporting a cam cutting tool 22 which is passed through alined openings adjacent the free ends of said brackets 21. Above the uppermost brackets 21 tool 22 connects with a flexible coupling 23 driven by shaft 24.

Carriage 25 is supported upon base 19 and is guided for a shifting movement thereon by a pair of rails 26 supported upon said base 19. Screw shaft 27 disposed between said rails 26 is provided with a smooth end 28 which extends through ledge 29 integrally formed with and upwardly projecting from the opposite end of said base 19. There said smooth end 28 is provided with crank handle 30 by means of which a manual rotatable movement in either direction may be imparted to said shaft 27. Said shaft 27 inwardly of carriage 25 is engaged with any suitable part of said carriage such as a lug or the like in order that a bodily shifting movement to said carriage 25 may be imparted in either direction to or away from standard 20 and cam cutting tool 22.

Extending in a lateral direction from said carriage 25 is shaft 31 provided at its free outer end with crank 32. Inwardly of said carriage 25 said shaft 31 connects with one of a series of gears for the purpose of imparting a rotary movement to the ultimate gear 33 (Fig. 4) which is keyed to shaft 12, and through which a rotary movement to said shaft 12 may be imparted in either direction when said crank 32 is turned in either direction. Said shaft 12 vertically extends from said carriage 25, and normally is adapted to be passed through opening 11 in cam blank 10 to which the latter is rigidly affixed. Carriage 25 is shifted towards tool 22 in order to shift therewith said cam blank 10 when a rotary movement to shaft 27 has been imparted. When crank 32 is revolved in a desired direction the edge of cam blank 10 will be shifted to either direction desired for the purpose of having said tool 22 cut a working surface upon said cam blank along any desired arc such as arc 13 indicated in Fig. 7, and which arc is centered at point 15.

To key cam blank 10 to shaft 12 and to rigidly support the cam blank with any predetermined point thereon, such as point 18, centered or alined with the axial center of said shaft 12, a suitable clamp constituting the subject matter of this application has been made. The clamp, generally indicated by 34 in Figs. 1 and 2, is of a U-shaped formation and includes upper jaw 35 and a lower jaw 36. Positioned intermediately of said jaws 35 and 36 is a metallic plate 37 having a plastic transparent plate 38 connected therewith and downwardly depending therefrom. A plurality of screws 39 (Fig. 2) connect the two plates. Made adjacent the free end of upper jaw 35 is bore 40. Plate 37 is provided with a threaded bore 41 which is substantially in alinement with said bore 40.

The lower threaded end of sleeve 42 is receivable within said bore 41 and is threadedly engageable with the adjacent body portion of said plate 37. The upper end of said sleeve 42 is receivable for free vertical shifting movement within bore 40 made in said upper jaw 35. The inner diameter of said sleeve 42 adjacent its lower end is smaller than the inner diameter of the remaining upper portion of said sleeve 42 causing a resultant shoulder 43 for the purpose of resting thereon the lower end of eye piece 44 (Fig. 2) supporting therewithin a magnifying glass.

Plate 37 is capable of bodily shifting movement to or away from upper jaw 35 being guided in that movement by said sleeve 42 as well as by a plurality of shafts 45 extending from the upper face of said plate 37 and entering bores 46 made in said upper jaw 35 within which said shafts are accommodated in their upright shifting movement, as is seen in Fig. 2.

Lower jaw 36 is provided with a transverse socket 47 for receiving therewithin shaft 12, the latter being keyed to said lower jaw 36 by means of screw 48. The body portion of said lower jaw 36 centrally of said socket 47 is provided with sight opening 49. Said socket 47 is in a concentric relation with bores 40 and 41 and sleeve 42.

Made upon either the upper or the lower face of transparent plate 38 is either a punch mark or a cross as at 50 (Fig. 3), which indicates the axial center of shaft 12, and which axial center of said shaft 12 may be seen and determined through said sight opening 49.

Receivable between said plate 38 and said lower jaw 36 is cam blank 10. The latter is manipulated between the two and shifted to any desired position with relation to the tool 22. Any predetermined point 18 is brought in alinement with mark 50. Such positioning of said point 18 will of course coincide with the axial center of shaft 12. The magnifying glass in eye piece 44 will facilitate the alining of point 18 with point 50. Plate 38 being made of plastic transparent material will admit sufficient light in order to visually determine the alinement of the two points.

When the two points coincide screw 51 by manually operating its knob is driven downwardly against plate 37 in order to cause plate 38 to bear on the cam blank 10 so as to clamp the latter between said plate 38 and the lower jaw 36. Said screw 51 defines only a temporary expedient for holding blank 10 clamped while a plurality of Allen screws 52 in threaded engagement with upper jaw 35 are operated in order to bear the same against said plate 37 for the purpose of bringing about a strong contactual pressure by plate 38 against the adjacent face of cam blank 10 disposed therebelow.

When clamp 34 is rigidly affixed to shaft 12 by means of screw 48, with cam blank 10 firmly clamped between plate 38 and lower jaw 36, a rotary movement imparted to said shaft 12 by the operation of crank 32 will cause the rotation of said clamp 34 upon the axis which coincides with the axial center of said shaft 12. When said crank 32 is turned in either direction, clamp 34 will be caused to angularly shift as is indicated by dotted lines in Fig. 3, for the purpose of shifting cam blank 10 as tool 22 cuts a working surface upon the blank along an arc such as arc 16.

Turning of handle 30 in one direction will shift carriage 25 and with it clamp 34 and the cam blank 10 supported thereby towards the cutting tool 22.

The front end of lower jaw 36 adjacent its bottom is undercut to define recess 53 for providing clearance for the adjacent end of lower bracket 21 when the clamp is brought to the proximity of tool 22, and as clamp 34 is angularly shifted back and forth by the operation of crank 32, it being noted that said bearing 21 is on a plane immediately above the upper face of said carriage 25 and in the path of said recess 53.

It is further observed that clamp 34 is in a spaced relation with the upper face of carriage 25 when the former remains in an operative position with shaft 12, and that is for the purpose of preventing rubbing of said clamp against the adjacent face of carriage 25.

Rib 54 made longitudinally of the clamp along its upper jaw 35 is merely for the purpose of strengthening the latter so that it would not bend upwardly due to the pressure exerted upon plate 37 by means of screws 52.

Although the transparency of plate 38 will be of a sufficient degree to admit light therethrough in order to aline points 18 and 50, I do not eliminate the possibility of using an electric bulb within plate 38.

From the hereinabove description it will be seen that plate 37 acts as a strengthening backing for plate 38. If the plastic material of which plate 38 is made had sufficient strength to act as a clamp member, in that event plate 37 could be eliminated and plastic plate 38 alone could be used. In that latter case the plastic plate would of course have to be of the thickness of both plates 37 and 38.

It is noted that sleeve 42 being shiftable in bore 40 coacts with said shafts 45 for guiding the shifting movement of plates 37 and 38 to or away from either of the jaws 35 and 36.

It is further observed that transparent plate 38 may be eliminated, in which case plates 37 and 38 could be substituted by one metallic plate, with bore 41 extended therethrough. The bottom end of sleeve 42 may be sealed with a transparent piece and a source of light introduced into said sleeve 42. The transparent piece within the bottom of said sleeve 42 may carry cross mark 50. It is of course an advantage having cross mark 50 as close to the clamping side of plate 37 as possible in order to eliminate any errors in alining mark 50 with mark 18 on the cam blank 10.

When work 10 is removed from the clamp plate 38 is permitted, due to gravity, to fall upon and contact with the lower jaw 36. To reinsert new work between said lower jaw 36 and plate 38 the latter is raised by manually grasping its side edges. Removal of the clamp from shaft 12 and inverting it to cause plate 38 to shift due to gravity toward the upper jaw 35 will accomplish the same purpose.

While there is described herein preferred embodiments of the present invention, it is nevertheless to be understood that minor changes may be made therein without departing from the spirit and scope of the invention as claimed.

What I claim as new is:

1. A clamp of the class described, comprising a member having a pair of parallelly disposed jaws, a clamping plate disposed between said jaws in the same plane therewith and in parallel relation thereto, means slidably connecting said clamping plate to one of said jaws for guided movement with respect thereto, and means carried by said one jaw for exerting pressure on said movable plate for shifting the latter in a clamping relation with the other jaw. said one jaw having a transverse side opening extending therethrough, the portion of said clamping plate aligned with said opening being transparent, and a mark on said transparent portion aligned with the axis of said opening.

2. A clamp of the class described, comprising a member having a pair of parallelly disposed jaws, a clamping means disposed between said jaws in the same plane therewith and in parallel relation thereto, means slidably connecting said clamping means to one of said jaws for guided movement with respect thereto, means carried by said one jaw for exerting pressure on said movable clamping means for shifting the latter in a clamping relation with the other jaw, said one jaw having a transverse sight opening extending therethrough, said clamping means comprising a metallic backing plate and a transparent clamping plate connected together, and a mark on the transparent plate aligned with the axis of said opening.

3. In a cam cutting machine, a carriage, a shaft on the carriage extending therebeyond and mounted for rotation thereon, a U-shaped clamp comprising a pair of aligned jaws having one of the jaws fixed to the extending portion of the shaft, the other jaw having an opening therein aligned with said shaft, a movable clamping plate disposed between said jaws and connected to one of said jaws for sliding guided movement with respect thereto, the portion of said plate aligned with said opening and said shaft being transparent and having a point marked thereon aligned with the center of said opening and axis of said shaft, and means carried by said second-named jaw for pressing said clamping plate in clamping relation with said first-named jaw.

References Cited in the file of this patent
UNITED STATES PATENTS

| | | |
|---|---|---|
| 1,191,803 | Levecque | July 18, 1916 |
| 1,549,912 | Ebel | Aug. 18, 1925 |
| 1,682,412 | Palmer | Aug. 28, 1928 |
| 1,906,201 | Simpson | Apr. 25, 1933 |
| 2,102,915 | Rishel | Dec. 21, 1937 |
| 2,109,849 | Price | Mar. 1, 1938 |
| 2,146,906 | Moller | Feb. 14, 1939 |
| 2,200,025 | Jones | May 7, 1940 |
| 2,279,616 | Canterbury | Apr. 14, 1942 |
| 2,428,201 | Cannarili | Sept. 30, 1947 |
| 2,577,534 | Lowe | Dec. 4, 1951 |
| 2,637,145 | Wasley | May 5, 1953 |
| 2,734,319 | Billeter | Feb. 14, 1956 |